(12) United States Patent
Kato et al.

(10) Patent No.: US 10,793,195 B2
(45) Date of Patent: Oct. 6, 2020

(54) VEHICLE BODY STRUCTURE

(71) Applicant: HONDA MOTOR CO., LTD., Minato-ku, Tokyo (JP)

(72) Inventors: Takashi Kato, Wako (JP); Satoru Kawabe, Wako (JP); Ken Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 16/269,034

(22) Filed: Feb. 6, 2019

(65) Prior Publication Data
US 2019/0248416 A1    Aug. 15, 2019

(30) Foreign Application Priority Data

Feb. 15, 2018    (JP) ................. 2018-024822

(51) Int. Cl.
| | |
|---|---|
| B62D 21/12 | (2006.01) |
| B62D 21/15 | (2006.01) |
| B60J 5/04 | (2006.01) |
| B60L 50/60 | (2019.01) |
| B62D 25/02 | (2006.01) |
| B62D 25/20 | (2006.01) |
| B60L 3/00 | (2019.01) |

(52) U.S. Cl.
CPC .......... B62D 21/157 (2013.01); B60J 5/0461 (2013.01); B60L 3/0007 (2013.01); B60L 50/66 (2019.02); B62D 21/15 (2013.01); B62D 25/025 (2013.01); B62D 25/2036 (2013.01)

(58) Field of Classification Search
CPC .... B62D 21/157; B62D 21/15; B62D 25/025; B62D 25/2036; B60L 50/66; B60L 3/0007; B60J 5/0461
See application file for complete search history.

(56) References Cited

U.S. PATENT DOCUMENTS

| | | | |
|---|---|---|---|
| 2014/0021744 A1* | 1/2014 | Imamura ................. | B62D 21/09 296/187.08 |
| 2016/0214662 A1* | 7/2016 | Emura .................... | B62D 37/02 |
| 2017/0072884 A1* | 3/2017 | Zannier ................ | B62D 29/005 |
| 2017/0106914 A1* | 4/2017 | Abe ...................... | B62D 21/152 |
| 2018/0236863 A1* | 8/2018 | Kawabe .................. | B60K 1/04 |
| 2018/0273099 A1* | 9/2018 | Wright ................. | B62D 21/157 |

FOREIGN PATENT DOCUMENTS

| | | |
|---|---|---|
| JP | 2006264476 A | 10/2006 |
| JP | 2014226958 A | 12/2014 |

* cited by examiner

*Primary Examiner* — Lori L Lyjak
(74) *Attorney, Agent, or Firm* — Armstrong Teasdale LLP

(57) ABSTRACT

Each side sill of a vehicle body structure includes in addition to an outer panel (21) and an inner panel (22) jointly forming a closed cross section structure (23), a first stiffener (25) extending in the fore and aft direction and interposed between the outer panel and the inner panel and having a lower edge joined to the lower edges of the outer panel and the inner panel, a second stiffener (26) formed as a channel member extending in the fore and aft direction and having an open side facing in the inboard direction, the second stiffener having an upper edge and a lower edge attached to an outboard side of the first stiffener, and a third stiffener (27) extending in the fore and aft direction and in a transverse direction to have an outboard edge joined to the first stiffener and an inboard edge joined to the inner panel.

11 Claims, 10 Drawing Sheets

VEHICLE BODY STRUCTURE

TECHNICAL FIELD

The present invention relates to a vehicle body structure, and in particular to a structure of a lower side part of a vehicle body.

BACKGROUND OF THE INVENTION

In a known vehicle body structure, a battery unit is positioned between a pair of side sills extending in the fore and aft direction on either lower side part of a vehicle body (see JP2014-226958A, for example). In such a vehicle body structure, in order to minimize the deformation of the battery unit at the time of a side crash, the part of the vehicle body associated with the side sills is required to be able to sufficiently absorb the impact load of the side crash. According to the proposal disclosed in JP2006-264476A, each side sill is formed by an inner panel and an outer panel which are joined to each other so as to form a hollow structure. This hollow structure is reinforced by a first stiffener interposed between the inner panel and the outer panel, and a second stiffener attached to the outboard side of the first stiffener. The second stiffener is made of an aluminum alloy, and defines a hollow structure in cooperation with the first stiffener. At the time of a side crash, the second stiffener undergoes a deformation between the outer panel and the first stiffener which are also deformed.

The capacity to absorb the impact load of a side crash depends on the load energy absorbing capability or the amount of deformation of the second stiffener. It is therefore crucial to ensure the second stiffener to deform in a predictable manner by limiting the inboard displacement of the second stiffener. In other words, a certain structure is required to transmit a reaction force to the second stiffener from the inboard side against the impact load applied from the outboard side.

BRIEF SUMMARY OF THE INVENTION

In view of such a problem of the prior art, a primary object of the present invention is to improve a vehicle body structure provided with a pair of side sills having an improved capacity to absorb the energy of an impact load of a side crash.

To achieve such an object, the present invention provides a vehicle body structure (1), comprising: a pair of side sills (2) extending in a fore and aft direction along either lower side part of a vehicle body; a floor panel (18) having a vertically facing surface and attached to upper sides of the side sills along respective lateral side edges thereof; and a pair of side members (12) each having an outboard edge attached to an inboard side of the corresponding side sill and an inboard edge attached a lower surface of the floor panel so as to form a closed cross section structure in cooperation with the corresponding side sill and the floor panel, wherein each side sill includes: an outer panel (21) formed as a channel member extending in the fore and aft direction and having an open side facing in an inboard direction; an inner panel (22) formed as a channel member extending in the fore and aft direction and having an open side facing in an outboard direction, the outer panel and the inner panel being joined to each other at upper and lower edges thereof; a first stiffener (25) extending in the fore and aft direction in a space defined between the outer panel and the inner panel and having a lower edge joined to the lower edges of the outer panel and the inner panel; a second stiffener (26) formed as a channel member extending in the fore and aft direction and having an open side facing in the inboard direction, the second stiffener having an upper edge and a lower edge attached to an outboard side of the first stiffener; and a third stiffener (27) extending in the fore and aft direction and in a transverse direction to have an outboard edge joined to the first stiffener and an inboard edge joined to the inner panel.

The second stiffener and the first stiffener are connected to the floor panel via the third stiffener, the inner panel, and the side member so that at the time of a side crash, the second stiffener and the first stiffener can receive a reaction force from the floor panel via the side member, the inner panel, and the third stiffener, and can deform in a reliable manner. As a result, the side sill can efficiently absorb the side impact load.

Preferably, the second stiffener is provided with at least one bending portion (31) which is bent inward of a channel defined thereby.

Thereby, the second stiffener is caused to deform in a predictable manner with the bending portion serving as a starting point of deformation so that the mode of deformation can be stabilized, and the amount of energy of the impact load that is absorbed can be maximized.

Preferably, the outboard edge of the third stiffener and the upper edge of the second stiffener transversely oppose each other via the first stiffener.

Thereby, at the time of a side crash, the third stiffener can efficiently transmit the reaction force to the second stiffener.

Preferably, the inboard edge of the third stiffener and the outboard edge of the corresponding side member transversely oppose each other via the inner panel.

Thereby, at the time of a side crash, the side member can efficiently transmit the reaction force to the third stiffener.

Preferably, the vehicle body structure further comprises a cross member (13) extending transversely and attached to the lower surface of the floor panel, two transverse ends of the cross member being joined to the respective side members.

Since the side member is attached to the cross member, the inboard displacement of the side member is minimized at the time of a side crash, the side member can efficiently transmit a reaction force to the inner panel, the third stiffener, the first stiffener, and the second stiffener.

Preferably, the vehicle body structure further comprises a battery case (51) positioned between the side sills and receiving a battery pack therein, and a pair of brackets (56) joining side parts of the battery case to the respective inner panels.

Thereby, the inner panel can transmit the reaction force from the battery case via the bracket at the time of a side crash.

Preferably, the battery case includes a lower case (52) having an opening facing upward and a flange (52B) extending along a periphery of the opening, and an upper case (53) closing the opening of the lower case and having a periphery joined to the flange of the lower case, the flange of the lower case being provided at a same height as the inboard edge of the third stiffener.

Thereby, when the bracket is deformed at the time of a side crash and the inner panel comes into contact with the lower case, the inboard edge of the third stiffener is caused to laterally oppose the lower flange via the inner panel. Thus, the lower flange of the battery case having a relatively high rigidity can efficiently transmit the reaction force to the third stiffener via the inner panel.

Preferably, each bracket includes a vertical wall portion (56A) extending downward from the flange of the lower case, and a transverse wall portion (56B) extending in the outboard direction from a lower end of the vertical wall portion to be joined to a lower part of the corresponding inner panel.

Thus, while the bracket is transversely interposed between the battery case and the side sill, an end of the bracket can be joined to a lower part of the inner panel provided adjacent to the lower end of the first stiffener.

Preferably, each bracket has a lower rigidity than the battery case against a transverse loading.

Since the bracket is deformed earlier than the lower case to absorb the energy of the impact load, deformation of the lower case can be minimized.

Preferably, the third stiffener is provided with a plurality of beads (27D) each extending in the transverse direction.

Thereby, the rigidity of the third stiffener can be increased with respect to a transverse loading so that a larger amount of energy of the impact load can be absorbed.

Preferably, the vehicle body structure further comprises a door slide rail provided between the inner panel and the outer panel, and located above the first stiffener, the door slide rail being configured to slidably guide a lower end of a slide door.

Thereby, the side sill having the door slide rail incorporated therein can be given with an improved capability to absorb the energy of a side crash load.

Thus, the present invention provides a vehicle body structure including a pair of side sills that is provided with an improved capacity to absorb the energy of an impact load of a side crash.

DETAILED DESCRIPTION OF THE PREFERRED EMBODIMENT(S)

Now the present invention is described in the following in more detail in terms of a concrete embodiment with reference to the appended drawings. In the following description, the various components of the vehicle body are made of metallic material such as steel sheet unless otherwise specified. The connecting, joining, bonding and attaching as used in the following disclosure may include various modes of connection such as welding, stir welding, fastening (rivets, screws, clips, etc.) and adhesive bonding. Since the vehicle body is generally symmetric about a central axial line extending in the fore and aft direction, only one side of the vehicle may be mentioned in the following description to avoid redundancy.

Figure 1:
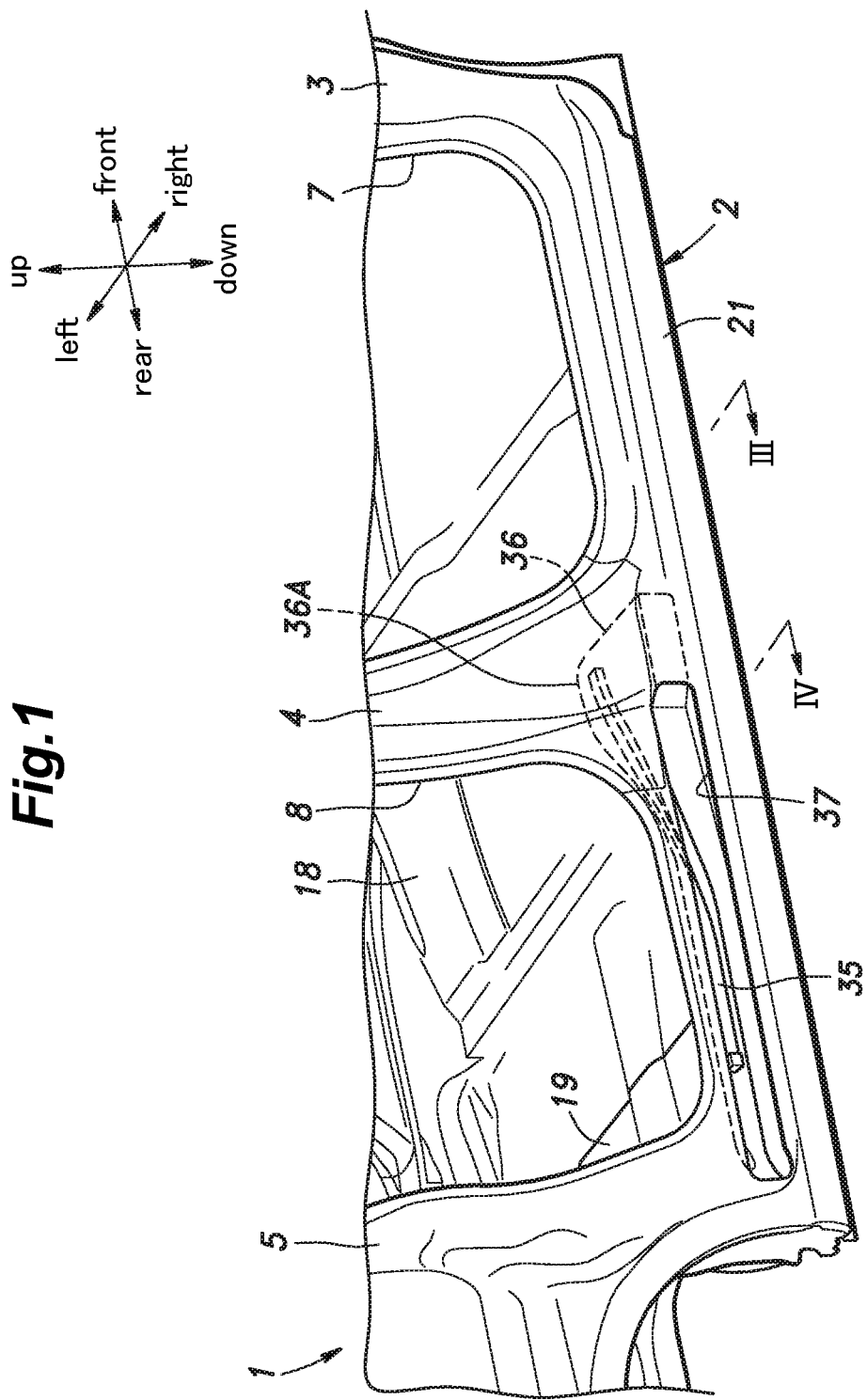
FIG. 1 is a fragmentary perspective view of a vehicle body structure according to an embodiment of the present invention as viewed from the right side.

As shown in FIG. 1, a pair of side sills 2 extending in the fore and aft direction are provided on either lower side part of a vehicle body structure 1 of a minivan type vehicle. A front end part of the side sill 2 is connected to a lower end of an A pillar 3 extending vertically, and an intermediate part of the side sill 2 with respect to the fore and aft direction is connected to a lower end of a B pillar 4 also extending vertically. A rear end part of the side sill 2 is connected to the lower end of a C pillar 5 also extending vertically. A front door opening 7 is defined between the A pillar 3 and the B pillar 4, and a rear door opening 8 is defined between the B pillar 4 and the C pillar 5. The front door opening 7 is fitted with a swing door (not shown in the drawings), and the rear door opening 8 is fitted with a slide door (not shown in the drawings).

Figure 2:
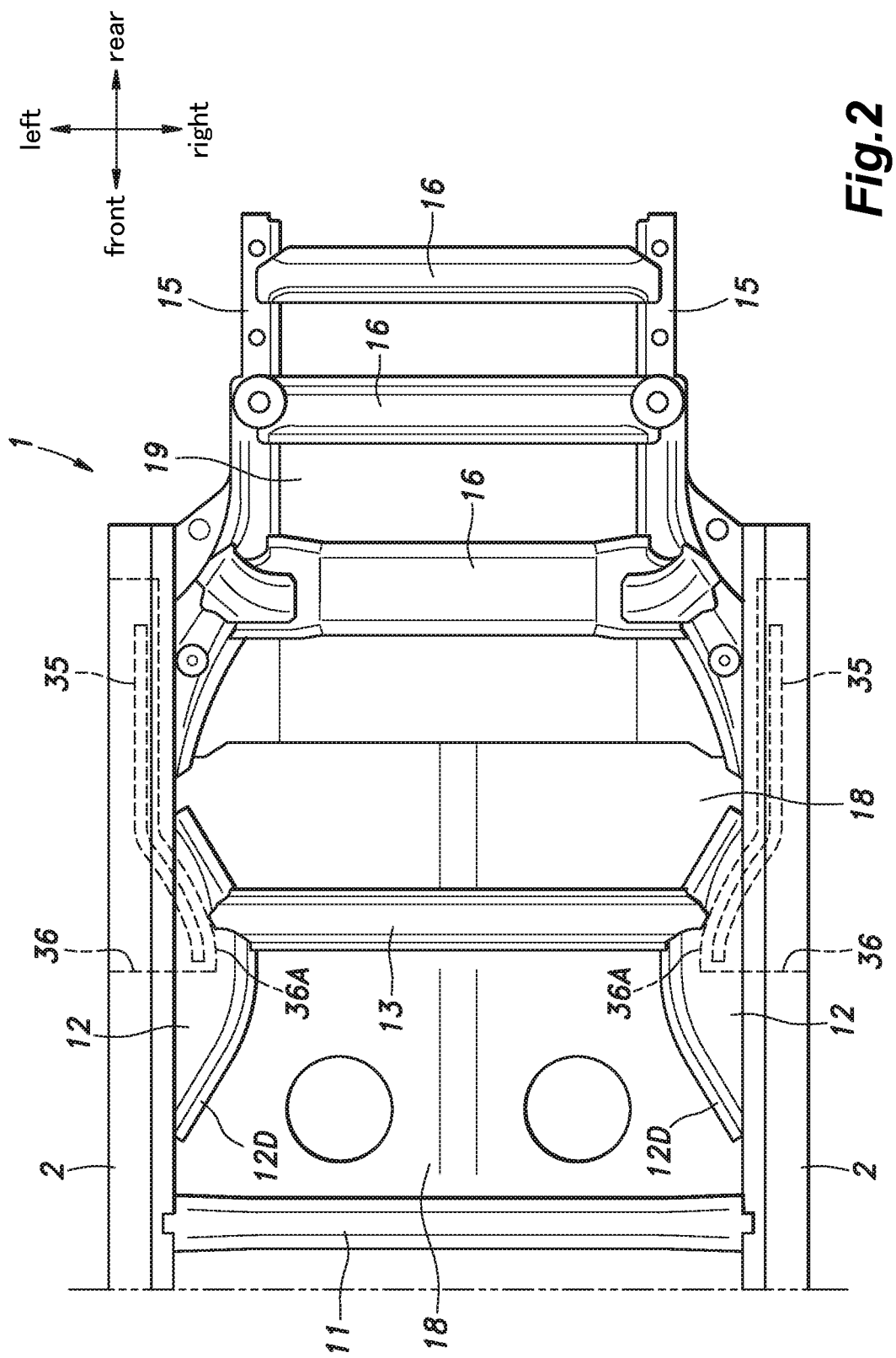
FIG. 2 is a bottom view of the vehicle body structure with a battery unit and brackets therefor being omitted from illustration.

As shown in FIG. 2, front parts of the side sills 2 are connected to each other by a front cross member 11 extending laterally. A pair of side members 12 are provided on the inner sides of the intermediate regions of the respective side sills 2 with respect to the fore and aft direction of the vehicle body. The side members 12 are connected to each other by the intermediate cross member 13 extending laterally. More specifically, the intermediate parts of the side sills 2 are connected to each other by the intermediate cross member 13 via the respective side members 12.

A rear side frame 15 is attached to the inner side of a rear end part of each side sill 2, and extends obliquely inward and rearward in a front part thereof, and extends linearly rearward in a remaining part thereof. The two rear side frames 15 are connected to each other by three rear cross members 16 extending laterally in a mutually spaced apart relationship.

A front floor panel 18 is attached to the upper surfaces of the front cross member 11 and the intermediate cross member 13. The front floor panel 18 extends substantially horizontally, and are joined to the side sills 2 along the respective side edges thereof. A rear floor panel 19 is attached to the upper surfaces of the side frames 15 and the rear cross members 16. A rear floor panel 19 is joined to the rear edge of the front floor panel 18 at the front edge thereof. The front floor panel 18 and the rear floor panel 19 jointly form the floor of the passenger compartment.

As mentioned earlier, the vehicle body is substantially symmetric about the center line extending in the fore and aft direction. Only the lower left part of the vehicle body structure 1 is described in the following to avoid redundancy.

Figure 3:
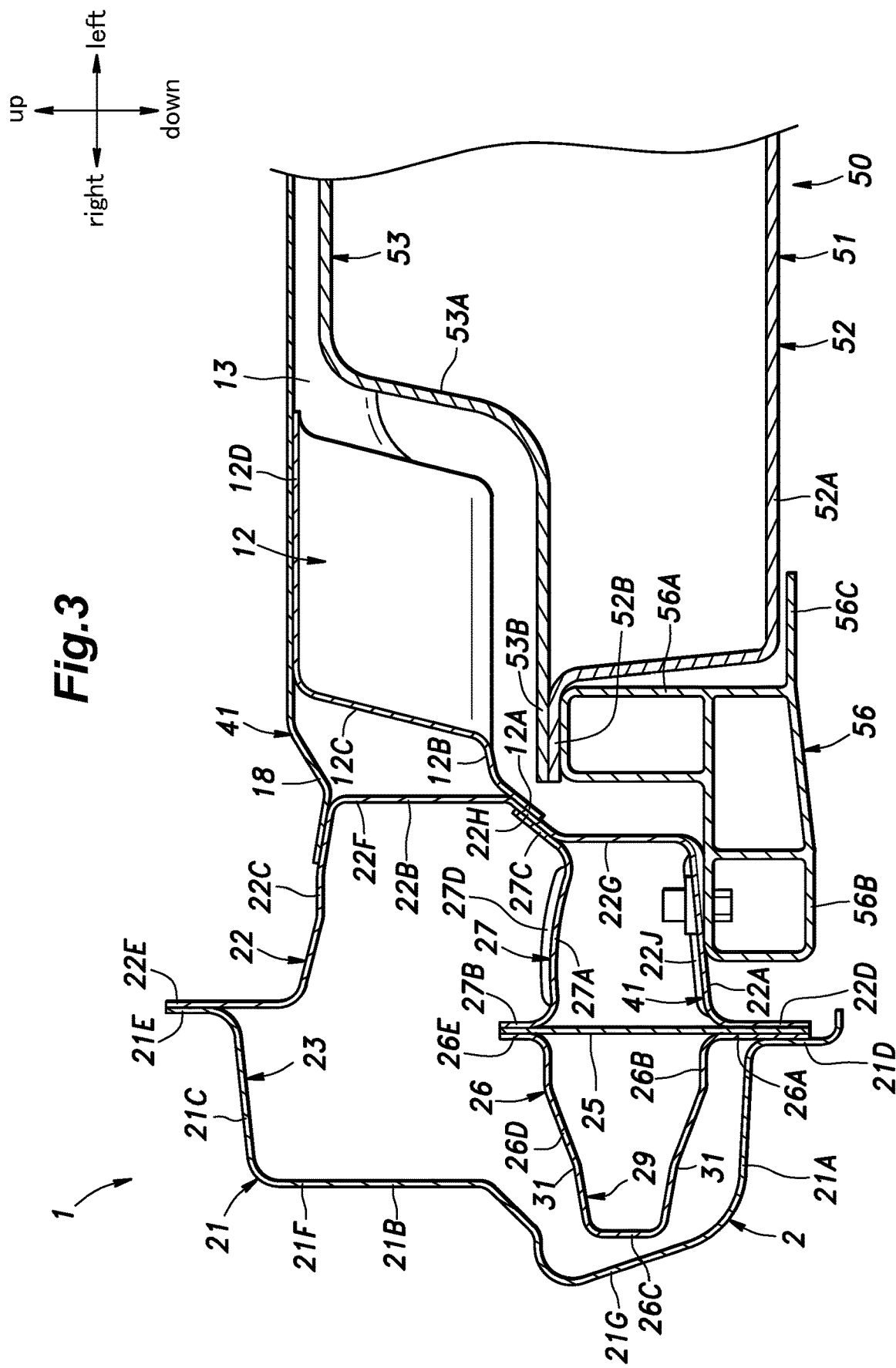
FIG. 3 is a sectional view taken along the line III-III of FIG. 1.
Figure 4:
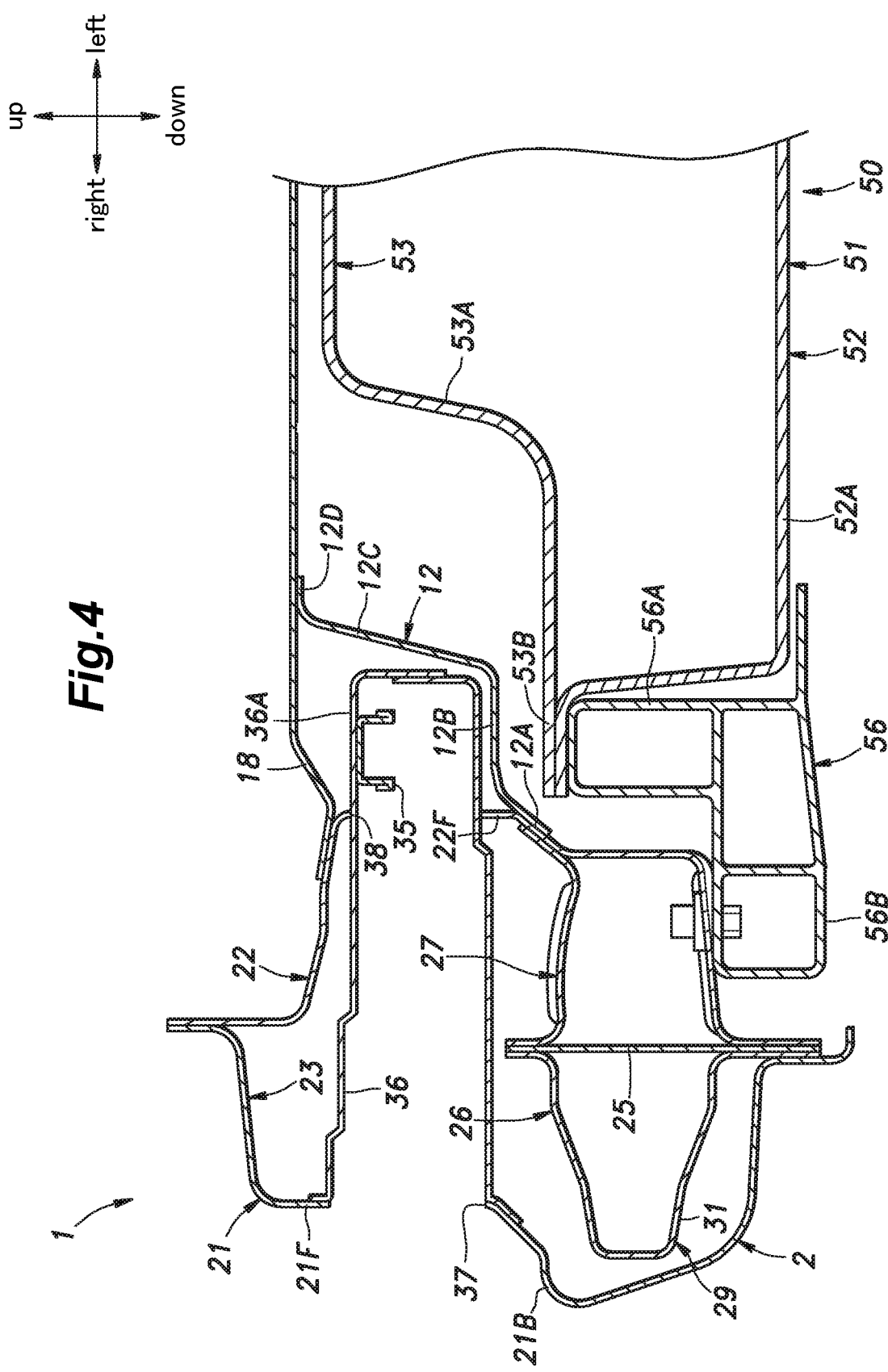
FIG. 4 is a sectional view taken along line IV-IV of FIG. 1.
Figure 5:
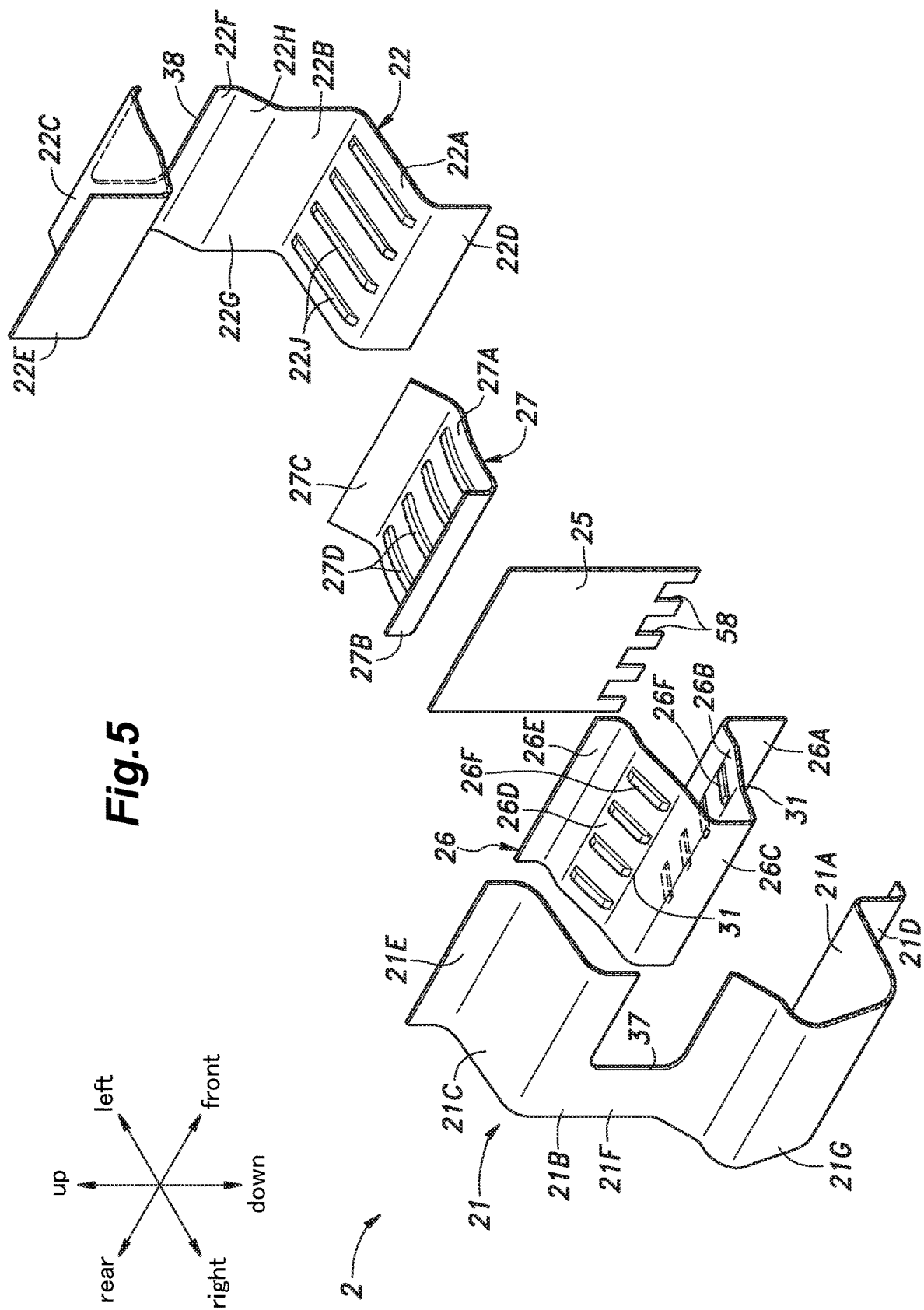
FIG. 5 is an exploded perspective view of a side sill.

As shown in FIGS. 3 to 5, the side sill 2 includes an outer panel 21 positioned on the outboard side, and an inner panel 22 positioned on the inboard side. The outer panel 21 is formed as a channel member having an open side facing in the inboard direction, and extending in the fore and aft direction. The inner panel 22 is also formed as a channel member having an open side facing in the outboard direction, and extending in the fore and aft direction, and is joined to the outer panel 21 along the upper edge and the lower edge thereof. The outer panel 21 and the inner panel 22 jointly form a closed cross section structure 23. Preferably, the outer panel 21 and the inner panel 22 are formed of high tensile steel.

More specifically, the outer panel 21 includes a lower wall 21A extending laterally, a vertical wall 21B extending upward from the outboard edge of the lower wall 21A, an upper wall 21C extending in the inboard direction from the upper edge of the vertical wall 21B, a lower flange 21D extending downward from the inboard edge of the lower wall 21A, and an upper flange 21E extending upward from the inboard edge of the upper wall 21C. The inner panel 22 includes a lower wall 22A extending laterally, a vertical wall 22B extending upward from the inboard edge of the lower wall 22A, an upper wall 22C extending in the outboard direction from the upper edge of the vertical wall 22B, a lower flange 22D extending downward from the outboard edge of the lower wall 22A, and an upper flange 22E extending upward from the outboard edge of the upper wall 22C. The upper flange 21E of the outer panel 21 and the upper flange 22E of the inner panel 22 are joined to each other, and the lower flange 21D of the outer panel 21 and the lower flange 22D of the inner panel 22 are joined to each other.

The vertical wall 21B of the outer panel 21 includes a vertical wall upper portion 21F extending substantially linearly downward from the outboard edge of the upper wall 21C, and a vertical wall lower portion 21G bulging in the outboard direction.

The vertical wall 22B of the inner panel 22 includes a vertical wall upper portion 22F extending substantially linearly downward from the inboard edge of the upper wall 22C, and a vertical wall lower portion 22G extending substantially linearly upward from the inboard edge of the lower wall 22A and offset from the vertical wall upper portion 22F in the outboard direction. The region of the vertical wall 22B located at the boundary between the vertical wall upper portion 22F and the vertical wall lower portion 22G is formed as a vertical wall intermediate portion 22H that is slanted in the inboard direction as one moves upward.

The lower flange 22D of the inner panel 22 is slightly offset upward from the lower flange 21D of the outer panel 21, and the outboard edge of the lower wall 22A of the inner panel 22 is offset upwardly with respect to the inboard edge of the lower wall 21A of the outer panel 21. The lower wall 22A of the inner panel 22 is provided with a plurality of beads 22J arranged in the fore and aft direction and each elongated in the lateral direction. The beads 22J increase the stiffness of the lower wall 22A against a laterally applied force, and absorb a large amount of energy when deformed under a lateral force. The beads 22J protrude upward from the lower wall 22A in the illustrated embodiment, but may also protrude downward if desired.

The closed cross section structure 23 formed by the outer panel 21 and the inner panel 22 is internally provided with a first stiffener 25, a second stiffener 26, and a third stiffener 27. The first stiffener 25 is formed as a planar plate-shaped member extending vertically and having a major plane facing laterally. The lower edge of the first stiffener 25 is interposed between the lower flange 21D of the outer panel 21 and the lower flange 22D of the inner panel 22. The upper edge of the first stiffener 25 extends to a substantially same height as the vertical wall intermediate portion 22H of the inner panel 22.

The second stiffener 26 is formed as a channel member having an open side facing in the inboard direction, and extending in the fore and aft direction. The second stiffener 26 includes a lower flange 26A located on the lower part of the open side of the second stiffener 26 and joined to the outboard side of the lower edge of the first stiffener 25, a lower wall 26B extending in the outboard direction from the upper edge of the lower flange 26A, a vertical wall 26C extending upward from the outboard edge of the lower wall 26B, an upper wall 26D extending in the inboard direction from the upper edge of the vertical wall 26C, and an upper flange 26E extending upward from the inboard edge of the upper wall 26D and joined to the outboard side of the upper edge of the first stiffener 25. The second stiffener 26 and the first stiffener 25 jointly form a closed cross section structure 29.

The lower flange 21D of the outer panel 21, the lower flange 26A of the second stiffener 26, the lower edge of the first stiffener 25, and the lower flange 22D of the inner panel 22 are laid over one another in that order in the inboard direction. As shown in FIG. 5, the lower edge of the first stiffener 25 is provided with a plurality of notches 58 extending upward. The lower flange 21D of the outer panel 21, the lower flange 26A of the second stiffener 26, and the lower flange 22D of the inner panel 22 are integrally welded at positions corresponding to the notches 58. More specifically, the lower flange 21D of the outer panel 21, the lower flange 26A of the second stiffener 26, and the lower flange 22D of the inner panel 22 are welded to one another, and the lower edge of the first stiffener 25 is interposed between the lower flange 26A of the second stiffener 26 and the lower flange 22D of the inner panel 22. Owing to this arrangement, the lower flange 21D of the outer panel 21, the lower flange 26A of the second stiffener 26, the lower edge of the first stiffener 25, and the lower flange 22D of the inner panel 22 are integrally joined to one another. In an alternative embodiment, the notches 58 are provided in the lower flange 26A of the second stiffener 26 instead of the lower edge of the first stiffener 25.

As shown in FIG. 3, the upper end of the upper flange 26E of the second stiffener 26 is positioned at the same height as the upper end of the first stiffener 25. An upper part of the lower flange 26A of the second stiffener 26 protrudes above the lower flange 21D of the outer panel 21. As a result, the lower wall 26B of the second stiffener 26 is positioned above the lower wall 21A of the outer panel 21 with a gap defined therebetween. The inboard edge of the lower wall 26B of the second stiffener 26 is positioned so as to oppose the outboard edge of the lower wall 22A of the inner panel 22 via the first stiffener 25. In other words, the inboard edge of the lower wall 26B of the second stiffener 26 and the outboard edge of the lower wall 22A of the inner panel 22 are positioned at a substantially same height.

The lower wall 26B and the upper wall 26D of the second stiffener 26 are inclined so as to come toward each other as one moves in the outboard direction. At least one of the lower wall 26B and the upper wall 26D is formed with at least one bending portion 31 bent inward of the channel shape (inward of the closed cross section structure 29) defined by the second stiffener 26. The bending portion 31 may be provided with a convex shape facing toward the interior of the closed cross section structure 29 in cross sectional view. In the illustrated embodiment, such a bending portion 31 is provided in each of the lower wall 26B and the upper wall 26D of the second stiffener 26.

As shown in FIG. 5, the lower wall 26B and the upper wall 26D of the second stiffener 26 are provided with a plurality of beads 26F arranged in the fore and aft direction and each extending in the lateral direction. The beads 26F increase the stiffness of the second stiffener 26 against a laterally directed loading, and increase the amount of energy that can be absorbed when deformed in the lateral direction. The beads 26F may either protrude upward or downward from the lower wall 26B and the upper wall 26D. The beads 26F are absent in the bending portions 31. In other words, the beads 26F are provided so as not to cross the bending portions 31.

The third stiffener 27 includes a transverse wall 27A extending both in the fore and aft direction and in the lateral direction, an outer flange 27B extending upward from the outboard edge of the transverse wall 27A, and an inner flange 27C extending upward and in the inboard direction from the inboard edge of the transverse wall 27A. The third stiffener 27 is joined to the first stiffener 25 at the outer flange 27B thereof located on the outboard edge of the third stiffener 27, and is joined to the vertical wall intermediate portion 22H of the inner panel 22 at the inner flange 27C thereof located on the inboard edge of the third stiffener 27. As shown in FIG. 5, the transverse wall 27A is provided with a plurality of beads 27D arranged in the fore and aft direction and each extending in the lateral direction. The beads 27D increase the stiffness of the third stiffener 27 against a laterally directed loading, and increases the amount of energy that can be absorbed when deformed in the lateral direction. The beads 27D may protrude either upward or downward from the transverse wall 27A.

As shown in FIG. 3, the outer flange 27B of the third stiffener 27 and the upper flange 26E of the second stiffener 26 laterally oppose each other via the first stiffener 25. In particular, the lower edges of the upper flange 26E of the second stiffener 26 and the outer flange 27B of the third stiffener 27 are substantially aligned with each other, or substantially at a same height. As a result, the inboard end of the upper wall 26D of the second stiffener 26 opposes the outboard end of the transverse wall 27A of the third stiffener 27, or are at a substantially same height.

As shown in FIG. 4, a door slide rail 35 extending in the fore and aft direction for slidably supporting a lower arm (not shown) extending from a lower end of a slide door is provided in a part of the vehicle body inboard of the outer panel 21 and the inner panel 22 and above the first stiffener 25. The door slide rail 35 is attached to the lower surface of the upper wall of a channel shaped rail case 36 having an open side facing in the outboard direction. An outer opening 37 facing in the outboard direction and extending in the fore and aft direction is formed in the vertical wall upper portion 21F of the outer panel 21. The opening edges or the outboard edges of the rail case 36 are joined to the opening edges of the outer opening 37. The lower arm of the slide door extends from the lower end of a slide door into the rail case 36, and the free end of the lower arm is supported by the door slide rail 35.

As shown in FIG. 1, FIG. 2 and FIG. 4, the rail case 36 is provided with a bulging portion 36A bulging in the inboard direction in the front end part thereof. The bulging portion 36A progressively bulges in the inboard direction toward the front so that the rail case 36 in effect progressively increases in depth (as measured in the lateral direction) toward the front. The door slide rail 35 is curved in the inboard direction in a front end part thereof corresponding to the bulging portion 36A. An inner opening 38 is passed through the vertical wall upper portion 22F of the inner panel 22 and extends in the fore and aft direction. The bulging portion 36A of the rail case 36 passes through the inner opening 38 and projects to a position more inboard than the vertical wall 22B. The front end of the door slide rail 35 is curved in the inboard direction so the slide door is pulled in the inboard direction in the closed position (front most position).

As shown in FIG. 2, a middle part of the side member 12 protrudes in the inboard direction in plan view in an arcuate manner. As shown in FIG. 3, the side member 12 includes an outer edge joining portion 12A joined to an inboard side face of the vertical wall intermediate portion 22H of the inner panel 22, a first inclined portion 12B extending obliquely in an inboard and upward direction from the outer edge joining portion 12A, a second inclined portion 12C extending in an inboard and upward direction from the inboard edge of the first inclined portion 12B at an angle relative to the horizontal plane greater than that of the first inclined portion 12B, and an inner edge joining portion 12D extending in the horizontal direction from the inboard edge of the second inclined portion 12C and joined to the lower surface of the front floor panel 18. In an alternative embodiment of the present invention, the first inclined portion 12B extends substantially horizontally.

The side member 12 forms a closed cross section structure 41 in cooperation with the front floor panel 18 and the inner panel 22. The protruding end of the bulging portion 36A of the rail case 36 extends into the closed cross section structure 41 formed by the side member 12. The outboard end of the intermediate cross member 13 is joined to the inboard side of the second inclined portion 12C of the side member 12.

A battery unit 50 is positioned under the front floor panel 18 and between the left and right side sills 2. The battery unit 50 includes a battery case 51, a battery pack (not shown) accommodated in the battery case 51, and a control unit (not shown) for controlling the charging and discharging of the battery pack. The battery case 51 is formed by combining a lower case 52 and an upper case 53.

The lower case 52 has a box-shaped main body 52A having an upper opening and a flange 52B extending along the opening edge of the upper opening of the main body 52A. The main body 52A is formed as a shallow rectangular pan. The flange 52B extends horizontally and along the entire periphery of the opening edge of the upper opening of the main body 52A.

The upper case 53 has a main body 53A having a lower opening and a flange 53B extending along the opening edge of the lower opening of the main body 53A. The main body 53A is formed as a shallow rectangular pan. The flange 53B extends horizontally along the opening edge of the lower opening of the main body 53A. The lower case 52 and the upper case 53 are joined to each other at the flange 52B and the flange 53B.

The battery case 51 is attached to the inner panel 22 of each side sill 2 by a bracket 56 extending in the fore and aft direction. The bracket 56 has a vertical wall portion 56A extending vertically and fastened to the lower surface of the flange 52B of the lower case 52 with threaded bolts, and a transverse wall portion 56B extending in the outboard direction from the lower end of the vertical wall portion 56A under the lower wall 22A and fastened to the lower surface of the lower wall 22A with threaded bolts. A support piece 56C extends in the inboard direction from the lower end of the vertical wall portion 56A and supports the bottom portion of the main body 52A from below.

The vertical wall portion 56A of the bracket 56 laterally opposes the vertical wall lower portion 22G of the inner panel 22 with a gap defined therebetween, and the upper end thereof is positioned at approximately a same height as the upper end of the vertical wall lower portion 22G. As a result, the flanges 52B and 53B of the battery case 51 are arranged at a substantially same height as the inner flange 27C provided at the inboard edge of the third stiffener 27. The flanges 52B and 53B of the battery case 51 are positioned under the side member 12 with a gap defined therebetween. In order to avoid interference with the side member 12, the main body 53A of the upper case 53 is provided with a narrower width as measured in the transverse direction than the main body 52A of the lower case 52.

The bracket 56 is made of an extruded aluminum alloy, and is provided with a hollow structure. It is preferable that the bracket 56 has a lower rigidity than the battery case 51 with respect to the load directed in the lateral direction.

The effect of the vehicle body structure 1 according to the embodiment configured as described above will be discussed in the following. In this vehicle body structure 1, the upper end of the second stiffener 26 is connected to the front floor panel 18 and the intermediate cross member 13 via the upper end of the first stiffener 25, the third stiffener 27, the vertical wall intermediate portion 22H of the inner panel 22 and the side member 12. Therefore, the load applied to an upper part of the second stiffener 26 at the time of a side crash is transmitted to the front floor panel 18 and the intermediate cross member 13 via the upper end of the first stiffener 25, the third stiffener 27, the vertical wall intermediate portion 22H of the inner panel 22, and the side member 12. This load transmission path is referred to as a first load transmission path. In other words, the second stiffener 26 can transmit a reaction force from the front floor panel 18 and the intermediate cross member 13 via the first load transmission path at the time of a side crash.

The lower end of the second stiffener 26 is connected to the battery case 51 via the lower portion of the first stiffener 25, the lower wall 22A of the inner panel 22, and the bracket 56. Therefore, the load applied to the lower portion of the second stiffener 26 at the time of a side crash is transmitted to the battery case 51 via the lower portion of the first stiffener 25, the lower wall 22A, and the bracket 56. This load transmission path is referred to as a second load transmission path. In other words, the second stiffener 26 can transmit a reaction force from the battery case 51 via the second load transmission path at the time of a side crash.

Figure 6:
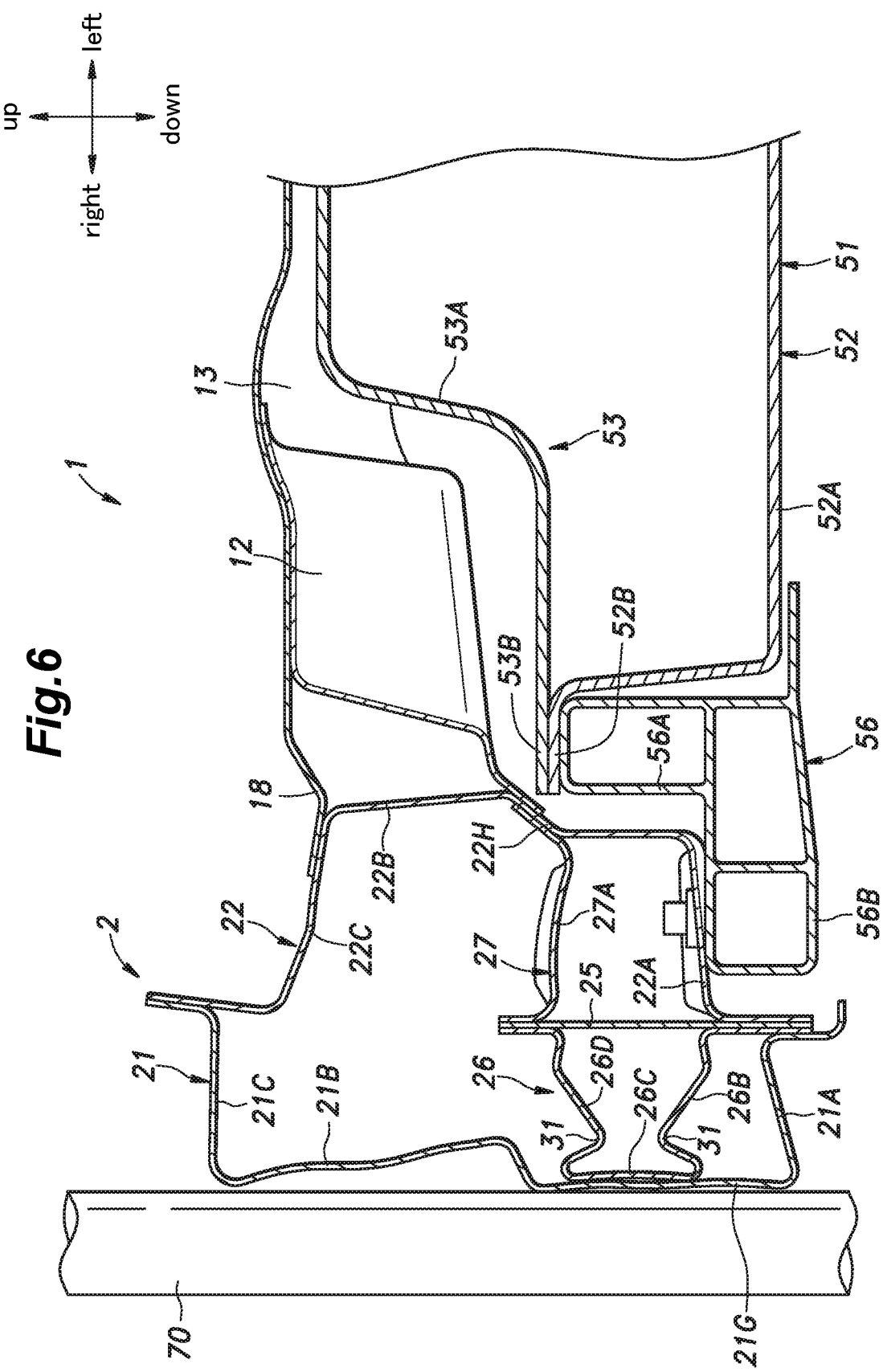
FIG. 6 is a sectional view similar to FIG. 3 in an early stage (first stage) of deformation.
Figure 7:
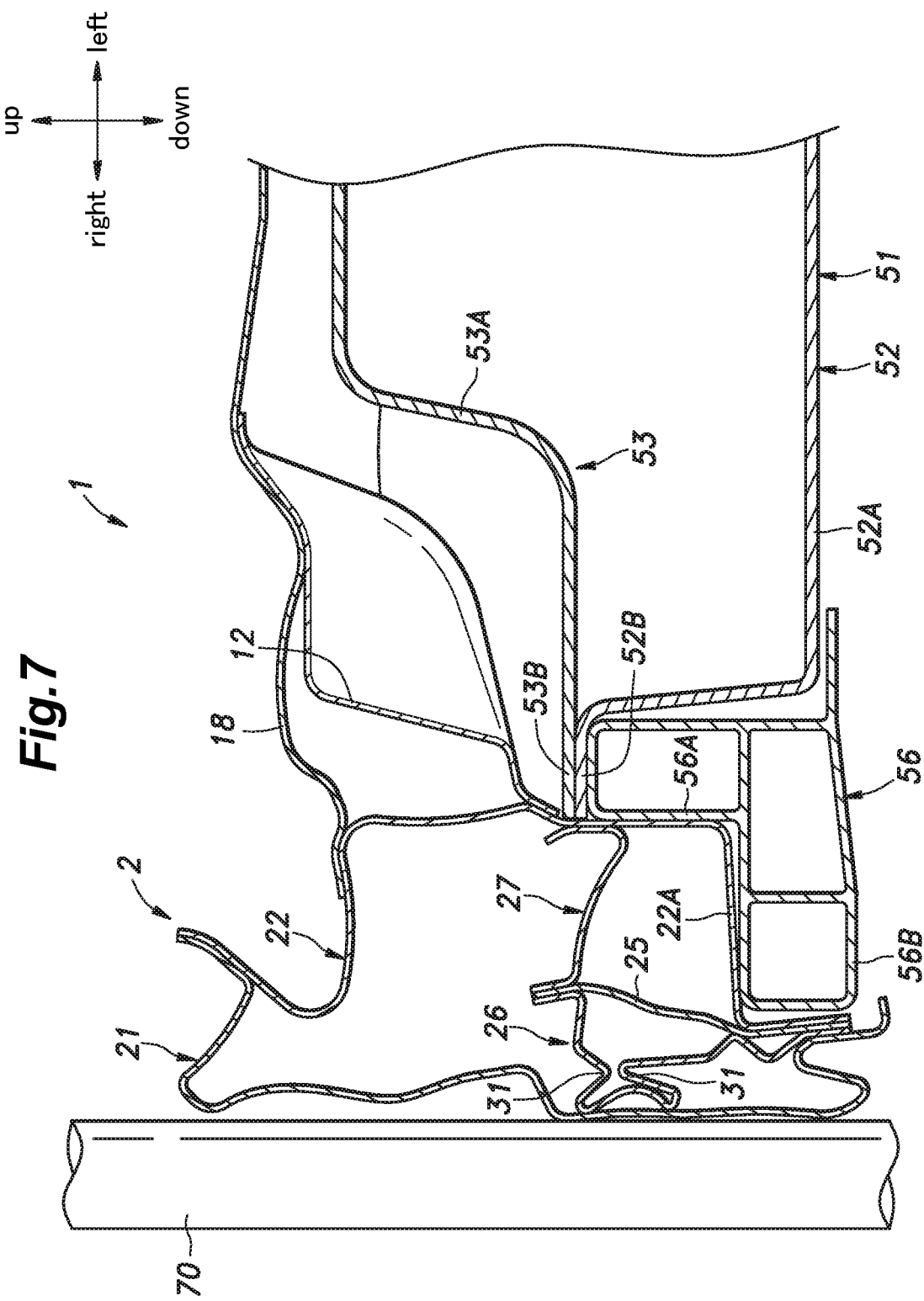
FIG. 7 is a sectional view similar to FIG. 3 in an intermediate stage (second stage) of deformation.
Figure 8:
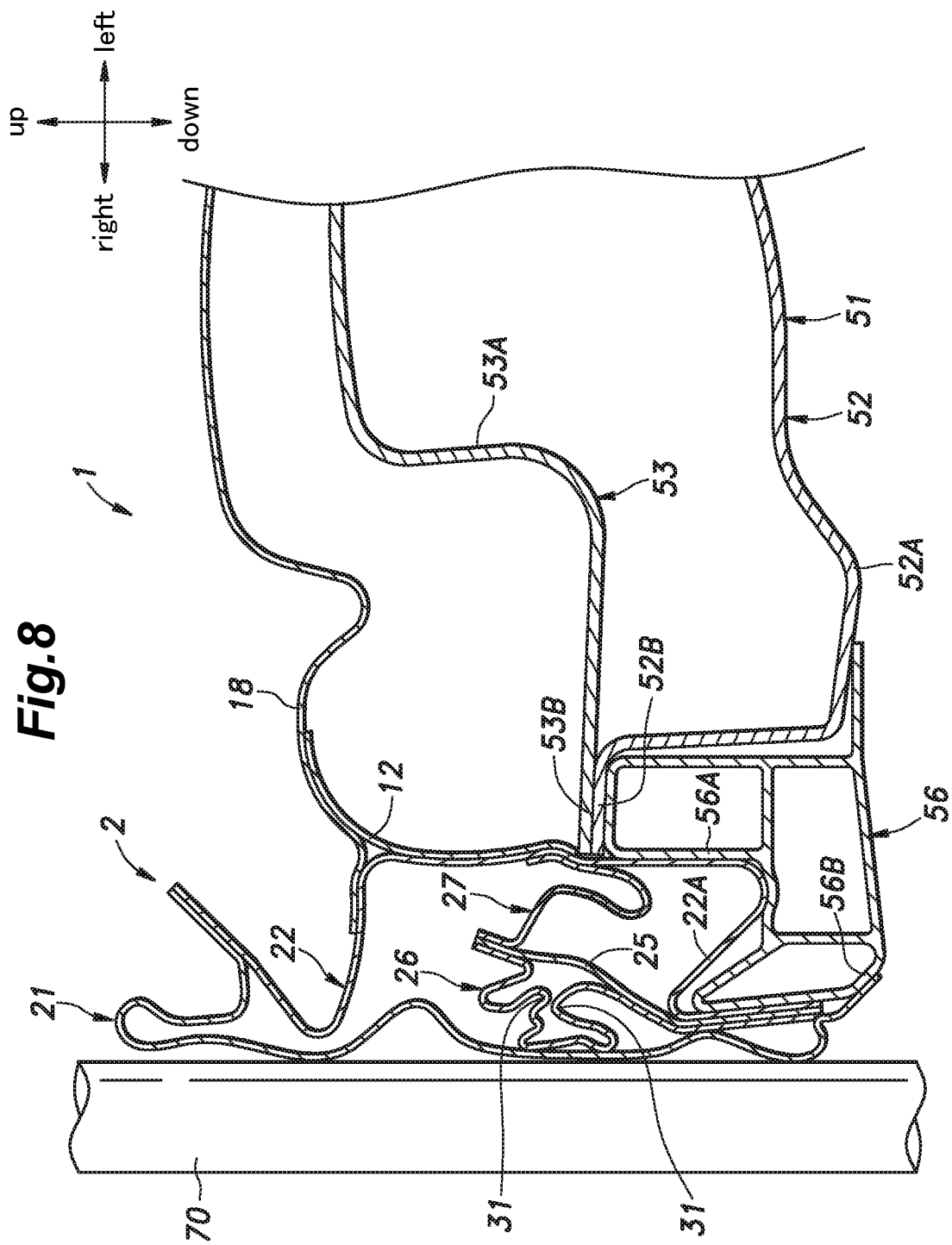
FIG. 8 is a sectional view similar to FIG. 3 in a final stage (third stage) of deformation.

FIGS. 6 to 8 show the mode of deformation of the vehicle body structure 1 when a vertically extending pole-like object 70 collides with the side sill 2 from sideways (as is the case at the time of a side crash). When the object 70 collides against the side sill 2 from the outboard side, the vertical wall lower portion 21G of the outer panel 21 that is located in a most outboard part of the side sill 2 first collides with the object 70. As shown in FIG. 6, the vertical wall lower portion 21G deforms inward upon receiving the load from the object 70, and hits the vertical wall 26C of the second stiffener 26. At this time, the second stiffener 26 receives a reaction force from the front floor panel 18 and the intermediate cross member 13 via the first load transmission path at the upper end portion so that a reaction force from the battery case 51 is transmitted to the lower end portion of the second stiffener 26 via the second load transmission path. As a result, the second stiffener 26 is compressed and deformed in the transverse direction between the outer panel 21 and the first stiffener 25. At this time, the second stiffener 26 deforms with each bending portion 31 acting as a starting point so that the deformation of the second stiffener 26 occurs in a predetermined deformation mode. More specifically, the lower wall 26B of the second stiffener 26 is bent so as to protrude upward while the upper wall 26D is bent so as to protrude downward owing to the mutually opposing convex curvatures of the bending portions 31. As a result, the vertical wall 26C is caused to move strictly in the inboard direction without moving vertically so that the lower wall 26B and the upper wall 26D of the second stiffener 26 are compressed in the transverse direction in a controlled manner. In particular, the second stiffener 26 is prevented from moving (swinging) vertically, and is compressed in the inboard direction substantially along a linear path. The energy of the load is thus absorbed by the deformation of the second stiffener 26. As the second stiffener 26 is compressed, the parts of the lower wall 26B and the upper wall 26D located on either transverse side of the bending portions 31 come into contact with each other in the transverse direction with the result that the reaction force starts increasing sharply, and the capability of the second stiffener 26 to transmit the reaction force sharply increases. In other words, a secondary crash that occurs to the lower wall 26B and the upper wall 26D causes the reaction force to be transmitted in an efficient manner. Thereafter, the lower wall 26B and the upper wall 26D are further compressed in the transverse direction and continue to transmit the reaction load. In this manner, the second stiffener 26 initially absorbs the energy of the side impact, and then starts transmitting the impact load in an efficient manner. The beads 26F increase the rigidity of the lower wall 26B and the upper wall 26D, and can thereby increase the amount of energy that the second stiffener 26 can absorb.

As the deformation of the second stiffener 26 progresses, as shown in FIG. 7, the third stiffener 27 and the side member 12 constituting the first load transmission path are deformed, and the front floor panel 18 is deformed to absorb the energy of the impact. In addition, the lower wall 22A of the inner panel 22 and the transverse wall portion 56B of the bracket 56 constituting the second load transmission path are deformed so as to absorb the energy of the impact load. As the side member 12, the front floor panel 18, and the transverse wall portion 56B of the bracket 56 are compressed in the transverse direction, the side sill 2 moves in the inboard direction until the vertical wall lower portion 22G abuts the vertical wall portion 56A of the bracket 56 and the flanges 52B and 53B of the battery case 51. Further, the lower flange 22D of the inner panel 22 abuts the outboard end of the transverse wall portion 56B of the bracket 56. Subsequently, as shown in FIG. 8, the third stiffener 27, the lower wall 22A of the inner panel 22, and the transverse wall portion 56B of the bracket 56 are interposed and compressed between the object 70 and the battery case 51 and/or the vertical wall portion 56A of the bracket 56. As a result, the energy of the impact load is thus further absorbed by the third stiffener 27, the lower wall 22A of the inner panel 22, and the transverse wall portion 56B of the bracket 56 as the deformation of these components progress further. At this time, the battery case 51 may slightly deform under the load.

Figure 9:
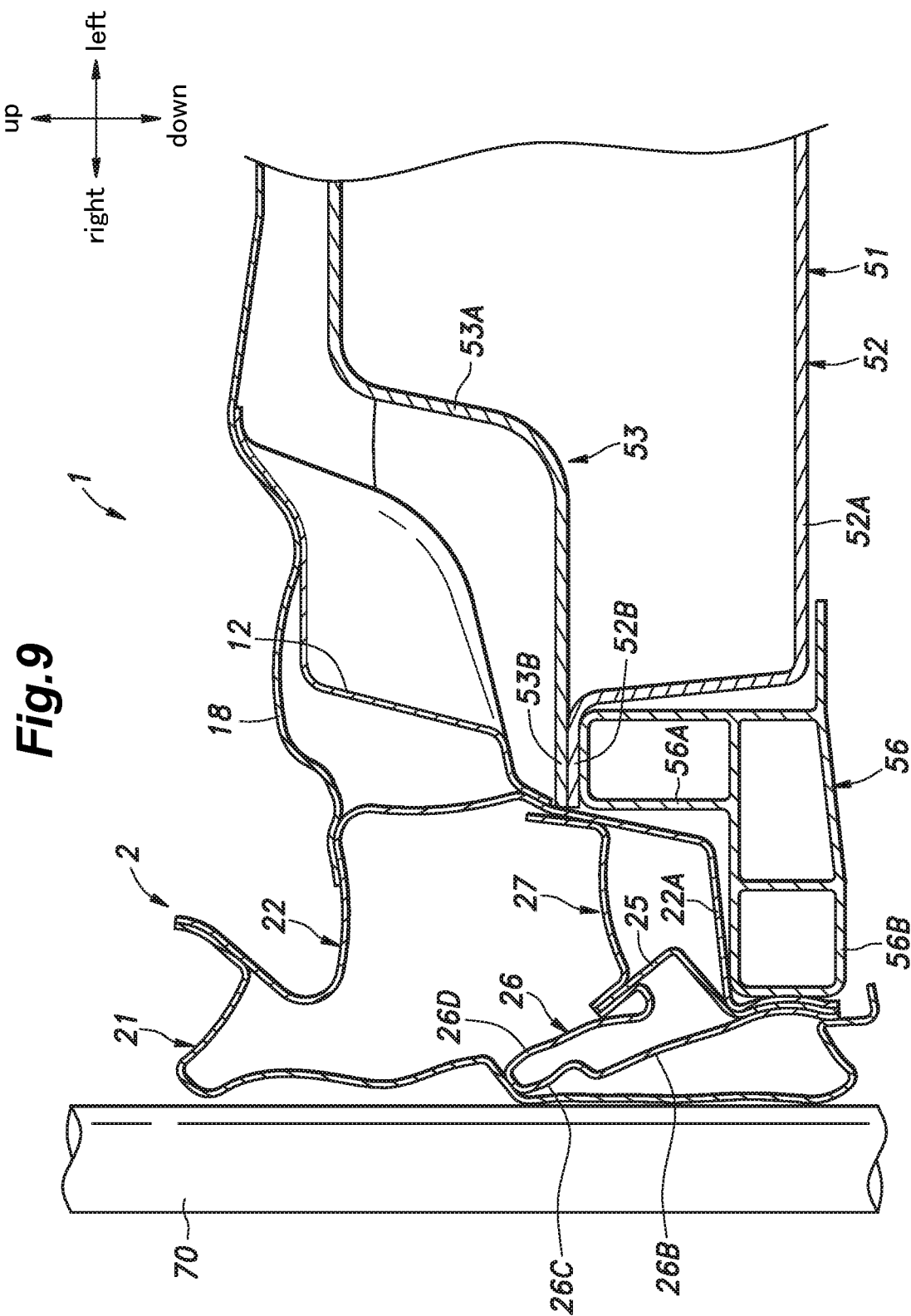
FIG. 9 is a sectional view similar to FIG. 8 of a vehicle body structure given as an example for comparison.

FIG. 9 shows an example for comparison. This vehicle body structure 1 is similar to that of the illustrated embodiment, but lacks the bending portions 31 in the second stiffener 26. When the bending portions 31 are omitted, there is no definite starting point of deformation in the lower wall 26B and the upper wall 26D. The boundary between the lower wall 26B and the lower flange 26A and the boundary between the upper wall 26D and the upper flange 26E are likely to be starting points of deformation owing to the sharp bends therein. As a result, the lower wall 26B and the upper wall 26D of the second stiffener 26 tend to incline upward or downward at the time of a side crash so that the lower wall 26B and the upper wall 26D do not undergo a compressive deformation. Therefore, the amount of energy absorbed by the second stiffener 26 under an impact load is substantially smaller than in the case of the illustrated embodiment where the bending portions 31 are provided. In addition, as the second stiffener 26 tilts upward or downward as a whole, the amount of the load transmitted by the first load transmission path decreases, and a greater amount of load must be transmitted by the second load transmission path. As a result, the load applied to the battery case 51 increases, and the amount of deformation of the battery case 51 increases.

Figure 10:
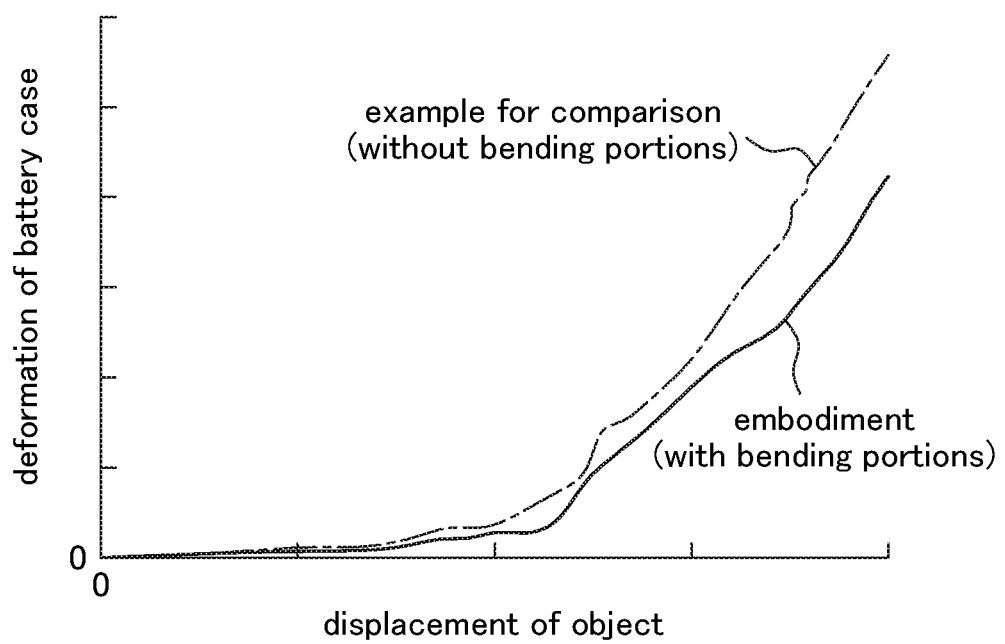
FIG. 10 is a graph showing the deformation history of a battery case with respect to a displacement of an object colliding with the vehicle body structure.

FIG. 10 is a graph showing the effect of the presence and absence of the bending portions 31 on the amount of deformation of the battery case 51. The horizontal axis represents the amount of the inboard movement of the object 70, and the value is set to 0 when the object 70 comes into contact with the side sill 2. The vertical axis represents the deformation amount of the battery case 51, or more specifically, the amount of movement of the outer edge of the battery case 51 in the inboard direction. As shown in FIG. 10, the amount of deformation of the battery case 51 when the bending portions 31 are provided is smaller than in the case where the bending portions 31 are not provided. This result is attributable to the fact that the amount of energy of the impact load absorbed by the second stiffener 26 is relatively small in the case of the example for comparison so that the load is applied to mainly via the second load transmission path, and the load applied to the battery case 51 increases.

In the vehicle body structure 1 according to the present embodiment, the second stiffener 26 and the first stiffener 25 are connected to the front floor panel 18 and the intermediate cross member 13 via the first load transmission path including the third stiffener 27, the inner panel 22 and the side member 12. As a result, at the time of a side crash, the second stiffener 26 and the first stiffener 25 receive a reaction force from the front floor panel 18 and the intermediate cross member 13 via the side member 12, the inner panel 22, and the third stiffener 27, and can thereby deform in a predetermined way at the time of a side crash. Further, the second stiffener 26 and the first stiffener 25 are connected to the battery case 51 via the second load transmission path including the inner panel 22 and the bracket 56. As a result, the second stiffener 26 and the first stiffener 25 receive a reaction force from the battery case 51 via the bracket 56 and the inner panel 22, and can thereby deform in a predetermined manner at the time of a side crash. By these means, the side sill 2 can efficiently absorb the energy of the side impact load.

Since the outer flange 27B which forms the outboard edge of the third stiffener 27 and the upper flange 26E which forms the upper edge of the second stiffener 26 laterally oppose each other via the first stiffener 25, the third stiffener 27 is enabled to efficiently apply a reaction force to the second stiffener 26 at the time of a side crash.

Since the inner flange 27C forming the inboard edge of the third stiffener 27 and the outer edge joining portion 12A forming the outboard edge of the side member 12 laterally oppose each other via the vertical wall intermediate portion 22H of the inner panel 22, the side member 12 is enabled to efficiently apply a reaction force to the third stiffener 27 at the time of a side crash.

Since the inboard edge of the lower wall 26B of the second stiffener 26 and the lower wall 22A of the inner panel 22 oppose each other via the first stiffener 25, the lower wall 22A of the panel 22 is enabled to efficiently apply a reaction force to the second stiffener 26.

Since the flanges 52B and 53B of the battery case 51 extend in the horizontal direction and are fastened to each other in an overlapping relationship, the stiffness of the main bodies 52A and 53A against a transverse load is enhanced. Since the flanges 52B and 53B of the battery case 51 are arranged at the same height as the inner flange 27C forming the inboard edge of the third stiffener 27, the inner flange 27C of the third stiffener 27 and the flanges 52B and 53B of the battery case 51 are likely to oppose each other via the vertical wall intermediate portion 22H of the inner panel 22 at the time of a side crash. Therefore, the battery case 51 is enabled to efficiently apply a reaction force to the third stiffener 27 via the inner panel 22 at the flanges 52B and 53B thereof. Further, since the battery case 51 abuts against the inner panel 22 at the flanges 52B and 53B having a relatively high rigidity than the main bodies 52A and 53A against a transverse load, the deformation of the battery case 51 can be minimized at the time of a side crash.

Since the bracket 56 is provided with the vertical wall portion 56A and the transverse wall portion 56B extending from the lower end of the vertical wall portion 56A in the outboard direction, an end of the bracket 56 can be joined to the lower wall 22A of the inner panel 22 which is located adjacent to the lower end of the first stiffener 25 while the bracket 56 is positioned transversely between the battery case 51 and the side sill 2. As a result, the bracket 56 is enabled to efficiently apply a reaction force to the first stiffener 25 at the time of a side crash. Further, as the side sill 2 moves in the inboard direction at the time of a side crash, the bracket 56 is compressed between the side sill 2 and the battery case 51, and can thereby absorb the energy of the impact load.

Since the bracket 56 has a lower rigidity than the battery case 51 against a transverse loading, the bracket 56 deforms earlier than the battery case 51 so as to absorb the energy of the impact load at the time of a side crash. As a result, the deformation of the battery case 51 can be minimized.

In the vehicle body structure 1 according to the present embodiment, the door slide rail 35 and the rail case 36 can be positioned in an upper part of the side sill 2. The door slide rail 35 and the rail case 36 are positioned above the first to third stiffeners 25 to 27 for absorbing the energy of the impact load at the time of a side crash. Thus, the vehicle body structure 1 according to the present embodiment can favorably absorb the energy of an impact load of a side crash even though the door slide rail 35 and the rail case 36 are provided in the side sill 2.

Although the present invention has been described in terms of a specific embodiment, the present invention is not limited by such an embodiment, but can be modified and altered in various ways without departing from the spirit of the present invention.

The invention claimed is:

1. A vehicle body structure, comprising:
a pair of side sills extending in a fore and aft direction along either lower side part of a vehicle body;
a floor panel having a vertically facing surface and attached to upper sides of the side sills along respective lateral side edges thereof; and
a pair of side members each having an outboard edge attached to an inboard side of the corresponding side sill and an inboard edge attached a lower surface of the floor panel so as to form a closed cross section structure in cooperation with the corresponding side sill and the floor panel;
wherein each side sill includes:
an outer panel formed as a channel member extending in the fore and aft direction and having an open side facing in an inboard direction;
an inner panel formed as a channel member extending in the fore and aft direction and having an open side facing in an outboard direction, the outer panel and the inner panel being joined to each other at upper and lower edges thereof;
a first stiffener extending in the fore and aft direction in a space defined between the outer panel and the inner panel and having a lower edge joined to the lower edges of the outer panel and the inner panel;
a second stiffener formed as a channel member extending in the fore and aft direction and having an open side facing in the inboard direction, the second stiffener having an upper edge and a lower edge attached to an outboard side of the first stiffener; and
a third stiffener extending in the fore and aft direction and in a transverse direction to have an outboard edge joined to the first stiffener and an inboard edge joined to the inner panel.

2. The vehicle body structure according to claim 1, wherein the second stiffener is provided with at least one bending portion which is bent inward of a channel defined thereby.

3. The vehicle body structure according to claim 1, wherein the outboard edge of the third stiffener and the upper edge of the second stiffener transversely oppose each other via the first stiffener.

4. The vehicle body structure according to claim 3, wherein the inboard edge of the third stiffener and the outboard edge of the corresponding side member transversely oppose each other via the inner panel.

5. The vehicle body structure according to claim 1, further comprising a cross member extending transversely and attached to the lower surface of the floor panel, two transverse ends of the cross member being joined to the respective side members.

6. The vehicle body structure according to claim 1, further comprising a battery case positioned between the side sills and receiving a battery pack therein, and a pair of brackets joining side parts of the battery case to the respective inner panels.

7. The vehicle body structure according to claim 6, wherein the battery case includes a lower case having an opening facing upward and a flange extending along a periphery of the opening, and an upper case closing the opening of the lower case and having a periphery joined to the flange of the lower case, the flange of the lower case being provided at a same height as the inboard edge of the third stiffener.

8. The vehicle body structure according to claim 7, wherein each bracket includes a vertical wall portion extending downward from the flange of the lower case, and a transverse wall portion extending in the outboard direction from a lower end of the vertical wall portion to be joined to a lower part of the corresponding inner panel.

9. The vehicle body structure according to claim 8, wherein each bracket has a lower rigidity than the battery case against a transverse loading.

10. The vehicle body structure according to claim 1, wherein the third stiffener is provided with a plurality of beads each extending in the transverse direction.

11. The vehicle body structure according to claim 1, further comprising a door slide rail provided between the inner panel and the outer panel, and located above the first stiffener, the door slide rail being configured to slidably guide a lower end of a slide door.

* * * * *